United States Patent
Kelmchuk

[15] 3,691,131
[45] Sept. 12, 1972

[54] STABILIZED POLYAMIDE COMPOSITIONS

[72] Inventor: Peter Kelmchuk, Yorktown Heights, N.Y. 10598

[73] Assignee: Ciba-Geigy Corporation, Ardsley, N.Y.

[22] Filed: Feb. 1, 1971

[21] Appl. No.: 111,672

[52] U.S. Cl. ....260/45.75 C, 260/45.7 P, 260/45.7 R, 260/45.8 N, 260/45.9 R
[51] Int. Cl. ....C08g 51/56, C08g 51/60, C08g 51/62
[58] Field of Search.......260/45.7 P, 45.75 C, 521 R, 260/45.75 C

[56] References Cited

UNITED STATES PATENTS

| | | | |
|---|---|---|---|
| 2,705,227 | 3/1955 | Stamatoff | 260/45.7 |
| 2,510,777 | 6/1950 | Gray | 260/45.7 |
| 3,398,115 | 8/1968 | Hecker et al. | 260/45.85 |
| 3,584,047 | 6/1971 | Dexter et al. | 260/559 |
| 3,340,227 | 9/1967 | Krieger | 260/45.75 |
| 3,285,855 | 11/1966 | Dexter et al. | 252/57 |
| 2,640,044 | 5/1953 | Stamatoff | 260/45.7 |
| 3,274,151 | 9/1966 | Settele | 260/45.75 |
| 3,533,986 | 10/1970 | Davy | 260/37 |

FOREIGN PATENTS OR APPLICATIONS

| | | | |
|---|---|---|---|
| 932,066 | 7/1963 | Great Britain | 260/45.75 |

OTHER PUBLICATIONS

Defensive Publication, T 872,009, Ser. No. 761,859 Filed 9/68

*Primary Examiner*—Donald E. Czaja
*Assistant Examiner*—R. A. White
*Attorney*—Karl F. Jorda and Nestor W. Shust

[57] ABSTRACT

Heat stabilized synthetic polyamide compositions are prepared by incorporating therein a mixture of a phenolic antioxidant and metal hypophosphite, a copper compound and metal halide. A typical embodiment includes polyamides which are stabilized with 1,2-bis[3,5-di-t-butyl-4-hydroxyphenyl)-propionamido]ethane and sodium hypophosphite, copper acetate and potassium iodide.

16 Claims, No Drawings

STABILIZED POLYAMIDE COMPOSITIONS

DETAILED DESCRIPTION

This invention relates to synthetic polyamide compositions having improved oxidative stability. More specifically, it relates to a synthetic polyamide composition stabilized against oxidative and thermal deterioration which comprises a polyamide, from 0 to about 0.25 weight percent of a metal hypophosphite wherein said metal is selected from the groups I$a$, II$a$ or II$b$ of the periodic table, from about 0.001 to about 0.03 weight percent of copper said copper being present in the form of a salt of an organic acid, and from 0.05 to about 5 weight percent of a metal halide selected from the group consisting of alkali metal and alkali earth metal chloride, bromide or iodide, and from about 0.01 to about 5 weight percent of a hindered phenolic compound having the formula:

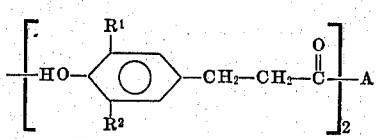

wherein
R$^1$ and R$^2$ are lower alkyl of from one to six carbon atoms, and
A is selected from the group consisting of

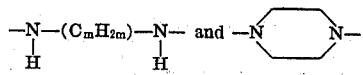

where $m$ is a number from 2 to 8 and —(C$_m$H$_{2m}$)— is linear or cyclic.

Illustrative examples of lower alkyl groups which are represented by R$^1$ and R$^2$ are methyl, ethyl, propyl, isopropyl, t-butyl, pentyl and hexyl. The preferred groups are methyl and the branched alkyls such as tertiary butyl and isopropyl.

Illustrative examples of the metal from groups Ia, IIa and IIb which can be used as the metal hypophosphite are lithium, sodium, potassium, barium, magnesium, calcium, strontium and zinc. The transition metal manganese can also be used. The preferred metal hypophosphites are sodium hypophosphite and potassium hypophosphite and sodium hypophosphite is the most preferred.

The copper compound which is employed is present in the polyamide as a copper salt of an organic acid. Illustrative examples of said organic acid are the alkanoic acids of from one to 10 carbon atoms such as formic acid, acetic acid, butyric acid, caproic acid and the like, aralkanoic acids such as 3,5-ditertiarybutyl-4-hydroxyphenyl propionic acid and aromatic acids such as benzoic acid.

Illustrative examples of the alkali metal halides and the alkali earth metal halides are the chlorides, bromides and iodides of lithium, sodium, potassium, magnesium, calcium, barium and the like. The preferable halide constituent is an iodide, especially sodium, calcium or potassium iodide and most preferable is potassium iodide.

By synthetic polyamides is meant condensation polymers obtained by the polycondensation of amino carboxylic acids or of mixtures of diamines and dicarboxylic acids including interpolyamides obtained by the polycondensation of mixtures of different polyamide forming components. More particularly, are intended the class of polyamides known generally as nylons of which polyhexamethylene adipamide and polycaprolactam are familiar examples. Within this class are also included interpolyamides that are obtained, for example, by the polycondensation of a mixture of hexamethylene diammoniumadipate with caprolactam.

This invention is useful for polyamides in all forms. Particularly preferred are those polyamides which may be obtained in fibrous form by melting, spinning the molten material and drawing the resultant filaments in a known manner. Particularly suitable polyamides of our invention are those in which the polyamide is polyhexamethylene adipamide.

The phenolic antioxidant, metal hypophosphite, copper salt and metal halide can be incorporated into the polyamide before, during, or after the polycondensation step. Thus the phenolic antioxidant, metal hypophosphite, copper salt and metal halide can be added to the polymer forming ingredients before the polycondensation step or during the polycondensation process and the reaction completed by heating. The stabilizer mixture can also be added to the already formed polyamide by adding the phenolic antioxidant, metal hypophosphite, copper salt and metal halide to the molten polyamide or alternatively they can be mixed with the solid polyamide or the solid polyamide in the form of lumps, pellets, or chips may be coated with the ingredients and the polyamide then melted. The preferred embodiment for the incorporation during polymerization is the addition of the stabilizer mixture just prior to discharge of the polyamide after the polycondensation is completed with enough time allowed for uniform distribution of the stabilizers throughout the melt.

Listed below are illustrative examples of the hindered phenolic derivatives of the general type described which can be effectively employed with a metal hypophosphite, the copper salt and metal halide to act as antioxidants for the purpose of the present invention:

1,6-bis[3-(3,5-di-t-butyl-4-hydroxyphenyl)propionamido]-hexane,
1,2-bis[3-(3,5-di-t-butyl-4-hydroxyphenyl)propionamido]-ethane,
1,4-bis[3-(3,5-di-t-butyl-hydroxyphenyl)propionamidomethyl]cyclohexane,
N,N'-bis[3-(3,5-di-t-butyl-4-hydroxyphenyl)propionyl]-piperazine,
1,6-bis[3-(3-methyl-4-hydroxy-5-t-butylphenyl)propionamido]hexane,
1,2-bis[3-(3-methyl-4-hydroxy-5-t-butylphenyl)propionamido]ethane,
1,6-bis[3-(3,5-dimethyl-4-hydroxyphenyl)propionamido]-hexane.

The hindered phenolic compounds of this invention, having the formula I above, can be prepared via a number of conventional amidation procedures. Thus, an acid of the formula

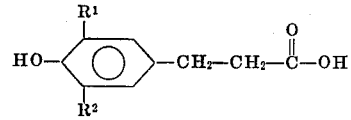

wherein $R^1$ and $R^2$ are as defined above or an alkyl ester thereof and a polyamine are heated in an inert solvent with the generation of water or an alcohol. Alternatively, the polyamine and the acid halide of the compound of formula II, generally the acid chloride, are allowed to react in an inert solvent, preferably in the presence of an organic or inorganic base which serves as an acid binding agent. The preparation of these compounds are explained further in Belgian Patent No. 726,092, issued June 27, 1969.

The amount of a metal hypophosphite incorporated into the polyamide may fall within the range of from 0 to 0.25 percent by weight of the polyamide but preferably within the range of from 0.05 to 0.15 weight percent. The amount of a hindered phenolic compound is within the range of 0.01 to 5 percent by weight of the polyamide but is preferably within the range of 0.1 to 2 weight percent. The amount of an organic copper salt corresponds to a range of from 0.001 to 0.03 weight percent copper by weight of polyamide. The halogen compound ranges from 0.05 percent to 5 percent based on the weight of polyamide but is preferably within the range from 0.10 to about 3 weight percent. In the preferred embodiment of the invention, the polyamide also contains a conventional delustrant such as titanium dioxide, ultraviolet light absorbers such as manganese compounds and coloring materials such as dyes and pigments.

The following examples will serve to further illustrate the nature of this invention which should not be construed as a limitation thereof.

EXAMPLE 1

Pellets (500 g) of unstabilized nylon-6,6 (Zytel 101, DuPont) were placed in a mixer. With mixing, a solution of 2.5 g (0.5 percent) of 1,2-bis[3,5-di-t-butyl-hydroxyphenyl)proprionamido] ethane in 20 ml of methylene chloride was added slowly. Sodium hypophosphite (0.5 gm, 0.1 percent) was dissolved in 20 ml of water and added slowly with mixing to the nylon pellets after the antioxidant solution had been added and most of the methylene chloride had evaporated. Copper acetate, 0.1021 g (0.02 percent, 65 ppm of $Cu^{++}$) and potassium iodide 0.7848 g (0.16 percent, 1,200 ppm of $I^-$) was dissolved in 35 cc of isopropanol and this solution was added slowly with mixing to the nylon pellets. The stabilized pellets were dried at 80° C at <1 mm for 4 hours.

The polyamide formulation was extruded at 600° F through a one-fourth inch die into a rod which was water cooled and chopped into pellets. A three-fourths inch Brabender extruder, equipped with a nylon screw was used. The pellets were dried at 80° at 1 mm for 4 hours.

The dried pellets were pressed into 5 × 5 × 0.005 inches films at 290° and 350 psi for 3 minutes. The mold was transferred quickly to a water-cooled press and maintained at 350 psi, for 2–3 minutes.

Samples (2.2 g) of compression molded nylon-6,6 films were aged in an air circulating, rotary oven at 150° C for various time periods. Stabilizer performances were assessed by measurements of specific viscosity retention of oven aged samples in 11 percent formic acid solution. The time in hours to 50 percent retention of the specific viscosity is reported in Table I below:

TABLE I

| % Hindered Phenol | % KI | % $NaH_2PO_2$ | Hrs. to 50% Retention of Specific Viscosity |
|---|---|---|---|
| 0.5 | None | None | 200 |
| 0.5 | 0.16 | 0.1 | 0.02 | >480 |

EXAMPLE 2

Following the procedure of Example 1, but using 2.5 g (0.5 percent) 1,2-bis[3-(3,5-di-t-butyl-hydroxyphenyl)propionamido]ethane, 0.1021 g (0.02 percent; 65 ppm $Cu^{++}$) copper acetate and 0.7848 g (0.16 percent; 1,200 ppm $I^-$) potassium iodide, a stabilized polyamide composition was obtained. The time to 50 percent retention of the specific viscosity is reported in Table II below.

TABLE II

| % f Hindered Phenol | % KI | % $Cu(OAc)_2$ | Hrs. to 50% Retention of Specific Viscosity |
|---|---|---|---|
| 0.5 | 0.16 | 0.02 | >480 |
| 0.5 | None | None | 200 |

EXAMPLE 3

Following the procedure of Example 1 but using 2.5 g (0.5 percent) of 1,2-bis[3-(3,5-di-t-butyl-4-hydroxyphenyl)propionamido]-ethane, 0.2433 g (0.05 percent; 50 ppm $Cu^{++}$) copper 3,5-di-t-butyl-4-hydroxyphenyl propionate and 0.7848 g (0.16 percent; 1,200 ppm $I^-$) potassium iodide, a stabilized polyamide composition was obtained. The time to 50 percent retention of the specific viscosity is reported in Table III below.

TABLE III

| % Hindred Phenol | % KI | Copper Salt (1) Hrs. to 50 percent Retention of Specific Viscosity |
|---|---|---|
| 0.5 | 0.16 | 0.05 | >480 |
| 0.5 | None | None | 200 |

1. Copper 3,5-di-t-butyl-4-hyrdroxyphenyl)propionate.

EXAMPLE 4

Following the procedure of Example 1, but using 0.5 percent of 1,6-bis[3,(3-methyl-4-hydroxy-5-t-butylphenyl)propionamido]-hexane, 0.1 percent potassium hypophosphite, 0.02 percent copper acetate and 0.16 percent potassium iodide, a stabilized polyamide composition is obtained which shows considerably less color development and substantially less weight loss after aging at 140°C for 65 hours than a polyamide which is unstabilized.

Stabilized polyamide compositions are prepared in a similar manner as above with the following stabilizer combinations:

a. 0.5 percent of 1,4-bis[3-(3,5-di-butyl-4-hydroxyphenyl)-propionamidomethyl]cyclohexane, 0.1 percent potassium hypophosphite, 0.02 percent copper acetate and 0.16 percent potassium iodide;

b. 0.5 percent of N,N'-bis[3-(3,5-di-t-butyl-4-hydroxyphenyl)-propionyl]piperazine, 0.1 percent sodium hypophosphite, 0.04 percent copper octoate, and 0.16 percent sodium iodide;

c. 0.5 percent of 1,2-bis[3-methyl-4-hydroxy-5-t-butylphenyl)-propionamido]ethane, 0.02 percent copper acetate and 0.16 percent potassium iodide.

EXAMPLE 5

To 39.3 g (0.15 moles) of hexamethylenediammonium adipate is added 0.177 g (7.5 × 10⁻⁴ mole; 0.5 mole percent) of hexamethylene diammonium diacetate as molecular weight control agent, 0.183 g (0.5 percent of theoretical nylon yield) of 1,2-bis[3-(3,5-di-t-butyl-4-hydroxyphenyl)propionamido]0.0366 g (0.1 percent of theoretical nylon yield) of sodium hypophosphite, 0.02 percent copper acetate based on the theoretical nylon yield, and 0.16 percent of potassium iodide based on the theoretical nylon yield. The mixture is mixed thoroughly and added to a Pyrex polymer tube.

The polymer tube is evacuated three times and filled with High Purity nitrogen each time. The polymer tube with a continuously maintained, slightly positive nitrogen pressure is placed in a methyl salicylate vapor bath at 222° C. After 1 hour at 222° C the polymer tube is transferred to a o-phenyl-phenol bath at 285° C for 1 hour. The polymer tube is kept in the 285° C vapor bath for an additional one-half hour while it is maintained under oil pump vacuum (<1 mm). High purity nitrogen is then readmitted and the polymer tube is allowed to cool.

The Nylon-6,6 obtained is ground in a mill at ambient temperature. About 2 g are heated in small glass Petri dish in a circulating air, rotary oven at 140° for 65 hours. The viscosity of a 1 percent sulfuric acid solution of aged and unaged polymer samples are determined at 25° C. Stabilizer effectiveness is judged by the percent retention of specific viscosity, color formation, and weight retention after oven aging. The stabilized polyamide has better viscosity, color retention and substantially less weight loss than a polyamide which is unstabilized after oven aging.

What is claimed is:

1. A synthetic polyamide composition stabilized against oxidative and thermal deterioration which comprises a polyamide having recurring amide groups as integral parts of the main polymer chain, from about 0.001 to about 0.03 weight percent of copper 3,5-di-t-butyl-4-hydroxyphenylpropionate, and from 0.05 to about 5 weight percent of a metal halide selected from the group consisting of alkali metal and alkali earth metal chloride, bromide or iodide, and from about 0.01 to about 5 weight percent of a hindered phenolic compound having the formula:

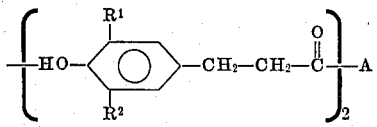

wherein

R¹ and R² are lower alkyl of from one to six carbon atoms,

A is selected from the group consisting of

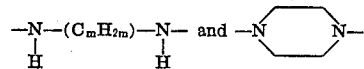

where $m$ is a number from 2 to 8 and —($C_mH_{2m}$)— is linear or cyclic.

2. The composition of matter of claim 1 wherein said metal halide is potassium iodide.

3. The composition of matter of claim 1 wherein the hindered phenolic compound is 1,6-bis[3-(3,5-di-t-butyl-4-hydroxyphenyl)-propionamido]hexane.

4. The composition of matter of claim 1 wherein the hindered phenolic compound is 1,2-bis[3-(3,5-di-t-butyl-4-hydroxyphenyl)-propionamido]ethane.

5. The composition of matter of claim 1 wherein the hindered phenolic compound is 1,4-bis[3-(3,5-di-t-butyl-hydroxyphenyl)-propionamidomethyl]cyclohexane.

6. The composition of matter of claim 1 wherein the hindered phenolic compound is N,N'-bis[3-(3,5-di-t-butyl-4-hydroxyphenyl)-propionyl]piperazine.

7. The composition of matter of claim 1 wherein the hindered phenolic compound is 1,6-bis[3-(3-methyl-4-hydroxy-5-t-butylphenyl)-propionamido]hexane.

8. The composition of matter of claim 1 wherein the hindered phenolic compound is 1,2-bis[3-methyl-4-hydroxy-5-t-butylphenyl)-propionamido]ethane.

9. The composition of matter of claim 1 which contains at least 0.25 weight percent of a metal hypophosphite wherein said metal is selected from the groups Ia, IIa, or IIb of the periodic table.

10. The composition of matter of claim 9 wherein the metal hypophosphite is sodium hypophosphite or potassium hypophosphite, and said metal halide is potassium iodide.

11. The composition of matter of claim 9 wherein the hindered phenolic compound is 1,6-bis[3-(3,5-di-t-butyl-4-hydroxyphenyl)-propionamido]hexane.

12. The composition of matter of claim 9 wherein the hindered phenolic compound is 1,2-bis[3-(3,5-di-ti-butyl-4-hydroxyphenyl)-propionamido]ethane.

13. The composition of matter of claim 9 wherein the hindered phenolic compound is 1,4-bis[3-(3,5-di-t-butyl-4-hydroxyphenyl)-propionamidomethyl] cyclohexane.

14. The composition of matter of claim 9 wherein the hindered phenolic compound is N,N'-bis[3-(3,5-di-t-butyl-4-hydroxyphenyl)propionyl]piperazine.

15. The composition of matter of claim 9 wherein the hindered phenolic compound is 1,6-bis[3-(3-methyl-4-hydroxy-5-t-butylphenyl)-propionamido]hexane.

16. The composition of matter of claim 9 wherein the hindered phenolic compound is 1,2-bis[3-methyl-4-hydroxy-5-t-butylphenyl)-propionamido]ethane.

* * * * *

UNITED STATES PATENT OFFICE
CERTIFICATE OF CORRECTION

Patent No. 3,691,131  Dated Sept. 12, 1972

Inventor(s) Peter Klemchuk

It is certified that error appears in the above-identified patent and that said Letters Patent are hereby corrected as shown below:

Title Page--Name of Inventor to be corrected from "Kelmchuk" to Klemchuk

Column 4 Table I should read--

| % Hindered Phenol | %KI | %NaH$_2$PO$_2$ | %Cu(OAc)$_2$ | Hrs. to 50% Retention of Specific Viscosity |
|---|---|---|---|---|
| 0.5 | None | None | None | 200 |
| 0.5 | 0.16 | 0.1 | 0.02 | >480 |

Column 4 Table II should read--

| % Hindered Phenol | %KI | %Cu(OAc) | Hrs. to 50% Retention of Specific Viscosity |
|---|---|---|---|
| 0.5 | 0.16 | 0.02 | >480 |
| 0.5 | None | None | 200 |

Column 4 Table III should read--

| % Hindered Phenol | %KI | % Copper Salt (1) | Hrs. to 50% Retention of Specific Viscosity |
|---|---|---|---|
| 0.5 | 0.16 | 0.05 | 480 |
| 0.5 | None | None | 200 |

1. Copper 3,5-di-t-butyl-4-hydroxyphenyl)propionate.

UNITED STATES PATENT OFFICE
CERTIFICATE OF CORRECTION

Patent No. 3,691,131  Dated Sept. 12, 1972

Inventor(s) Peter Klemchuck  Page - 2

It is certified that error appears in the above-identified patent and that said Letters Patent are hereby corrected as shown below:

<u>Column 5, line 7</u>: "hydroxyphenyl)propionamido]0.0366 g (0.1" should read -- hydroxyphenyl)propionamido]ethane, 0.0366 g (0.1 --

Signed and sealed this 28th day of January 1975.

(SEAL)
Attest:

McCOY M. GIBSON JR.
Attesting Officer

C. MARSHALL DANN
Commissioner of Patents